(No Model.)
J. B. LOVE.
WATER PURIFYING APPARATUS.
No. 401,186. Patented Apr. 9, 1889.
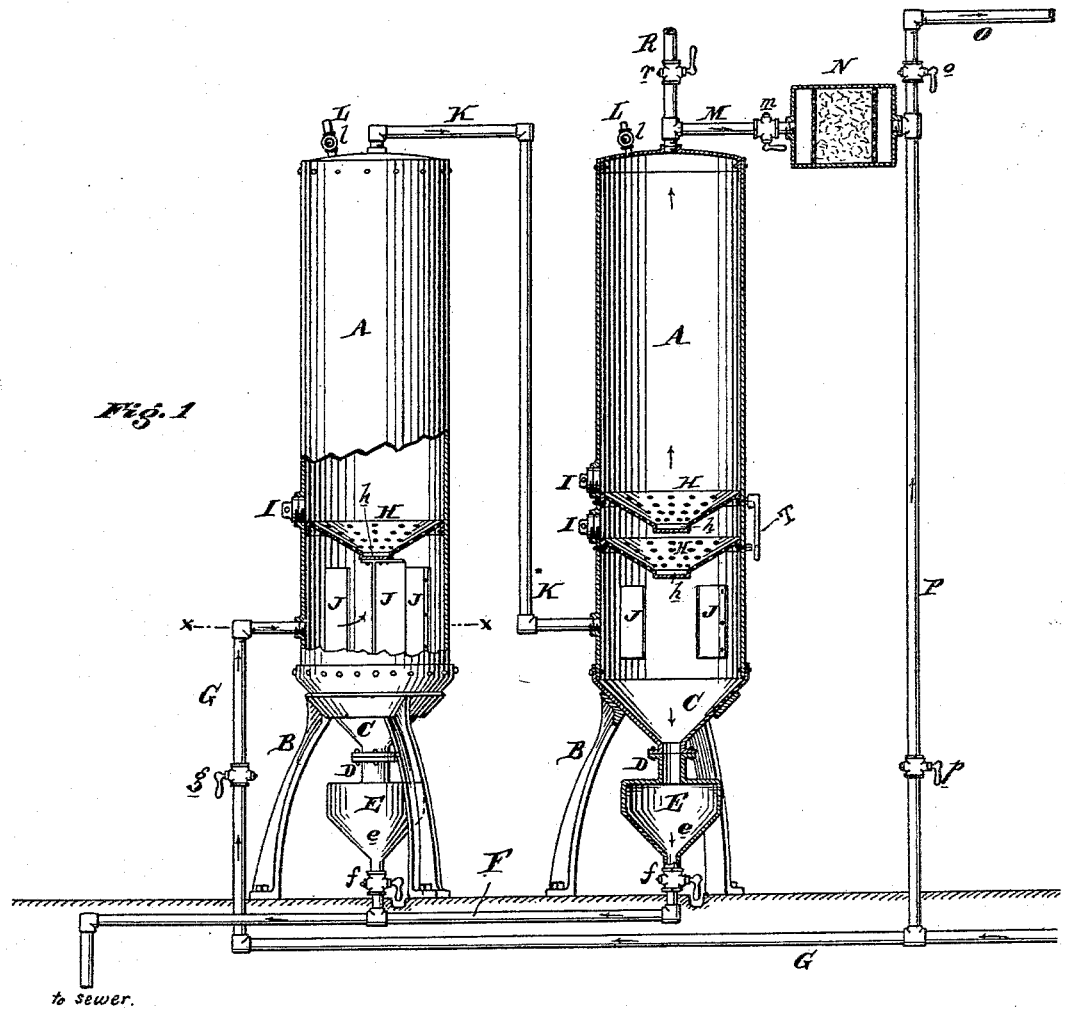
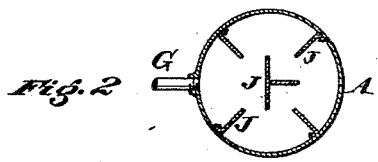
Attest:
Abner J. Davis.
Inventor:
John B. Love
by his attorney
G. J. Harding

UNITED STATES PATENT OFFICE.

JOHN B. LOVE, OF PHILADELPHIA, PENNSYLVANIA.

WATER-PURIFYING APPARATUS.

SPECIFICATION forming part of Letters Patent No. 401,186, dated April 9, 1889.

Application filed May 1, 1888. Serial No. 272,433. (No model.)

*To all whom it may concern:*

Be it known that I, JOHN B. LOVE, a citizen of the United States, and a resident of the city and county of Philadelphia, State of Pennsylvania, have invented a new and useful Improvement in Water-Purifying Apparatus, of which the following is a full, clear, and exact description, reference being had to the accompanying drawings, which form part of this specification.

The object of my invention is to provide a suitable apparatus capable of purifying water and other liquids by a settling apparatus in which gravity is made to do the work.

In purifying water for household purposes I can so arrange the apparatus that the impure water cannot be received into the house except by passing through the settling apparatus. The tanks or settlers being air-tight, the water stored in them will remain pure, as no impurities from the atmosphere can be taken up.

In carrying out my invention I arrange one or more vertical tanks in the cellar, or any other convenient place, and pass the water to be purified through them, the dirt which is carried in mechanical suspension in the water being deposited by the action of gravity on the conical perforated diaphragms, from which it may be removed. Such of the dirt as is deposited prior to passing through the diaphragms is received upon a conical bottom of the tank, and ultimately passes through a neck into a receiver, from which it may from time to time be blown off to the sewer or elsewhere. The dirt deposited through the neck into the receiver, where it settles, will not again mix with the water coming from the main into the tank, on account of the neck being so small that no disturbance can be created in the receiver in which the dirt is deposited. The water so purified may be delivered to the house by a suitable valved pipe, or it may be passed through the filter and then to the house. In addition to these means for carrying the water to the house, the water may be supplied directly from the main by a valved pipe, so that it is led around the settling-tanks and filter and does not go through them prior to being used.

In the drawings, Figure 1 is a vertical section of my improved purifying apparatus. Fig. 2 is a sectional plan view of part of the same on line $x\,x$.

A A are two vertical settling-tanks, and may be made of sheet-iron or any other such material, with conical bottoms C, which terminate in necks D, leading to the dirt-collecting vessels E, also preferably having conical bottoms $e$, which connect with the discharge-pipe F, leading to the sewer or elsewhere, and the discharge into this pipe is controlled by suitable valves, $f$. The tanks may be supported on iron chairs or frames B. Within the tanks, at some distance from the bottom, are arranged one or more perforated diaphragms, H, preferably conical, with a depressed center or well, $h$, to collect the deposited dirt, and which may be removed from time to time through hand-holes I, immediately above the diaphragms, or may be turned completely upside down by the handle T, so that when the air-valves $l$ and pipe L at the top of the tank are open and the water drawn out at the bottom the rush of the water coming in the opposite direction will remove the dirt deposited on the diaphragm.

G is the water-main leading from the street, and connects with the first tank A at some distance below the diaphragm H, and the water-supply is regulated by a valve, $g$. To cause the water to rise up quietly in the tank prior to passing through the diaphragms, I arrange vertical blades J in the tanks, as shown. The water after passing through the first tank A may pass by a pipe, K, into the second tank, and so on, and it passes from the tank or series of tanks by a pipe, M, to filter N, and by pipe O the water which passes through the filter may pass to the house. The pipes M and O may have valves $m$ and $o$ to control the flow of the water. Branching from the pipe M is a pipe, R, which is provided with a valve, $r$. A pipe, P, may connect the water-main G with the pipe O, and may have a valve, $p$, to control the flow of the water through it.

In filling the tank with water the air-valve $l$ and pipe L at the top of the tank are left open, and when the tanks are filled these valves $l$ are closed. If the valve $g$ is closed and the valve $p$ open, the water will pass direct from the main G to the pipe O, and such water is impure and may be used for scrubbing and house-cleaning. If the valves $m$ and $p$ are closed and valves $r$ and $g$ open, the water will be purified in the settling-tanks and delivered to the house by pipe R, and may be used for washing and bath purposes. If the valves $p$ and $r$ are closed and the valves $g$, $m$, and $o$ open, the water will not only be purified in the settling-tanks, but also in the filter N, and such water may be used for drinking and cooking purposes. It is evident that the water may be drawn from the pipes O and R, if so desired.

When sufficient dirt accumulates in the vessels E, the valves $f$ are opened and the dirt blown out by the pressure of the water from the street-main. Any mud or collections on the diaphragms H may be removed through the hand-holes I, or by inverting the diaphragms by turning the handle T, as heretofore described. It is also evident that by opening the valve $r$ from time to time and letting the full pressure of the water on, much of the dirt from the upper part of the tank might be blown out.

It is obvious that the ordinary circulating-boiler used in many houses can be arranged to operate as a settling-purifier, in addition to its regular use, without departing from my invention, by making the boiler with a conical bottom, and having a settling-chamber below it communicating with the boiler by a tubular neck.

I do not limit myself to the mere details of construction nor to the specific arrangement and connection of the parts shown, for these may be modified without departing from the spirit of my invention.

Having now described my invention, what I claim as new, and desire to secure by Letters Patent, is—

1. In combination, a water-supply main, settling-purifiers having conical bottoms, collecting-chambers below said purifiers communicating with said purifiers by tubular necks, perforated diaphragms, pipe-connection between the supply-main and purifier below the diaphragms, and a valved blow-off pipe from the dirt-collecting chamber.

2. The combination of a street water-main, settling-purifiers having conical bottoms, collecting-chambers below said purifiers communicating with said purifiers by a tubular neck, a filter proper, pipe-connections for causing water to pass successively through the purifiers and filter to the house, and an auxiliary valved pipe leading directly from the purifiers to the house to convey water which does not pass through the filter.

3. A water-settling purifier having a conical bottom, and a collecting-chamber below it communicating with its conical bottom by a tubular neck, and in which the collecting-chamber also has a conical bottom, in combination with a valved blow-off pipe at the bottom of the collecting-chamber.

In testimony of which invention I have hereunto set my hand, at Philadelphia, Pennsylvania, this 28th day of April, 1888.

JOHN B. LOVE.

Witnesses:
RICHD. S. CHILD,
ABNER J. DAVIS.